US005531196A

United States Patent [19]

Clark

[11] Patent Number: 5,531,196

[45] Date of Patent: Jul. 2, 1996

[54] OIL PAN NOISE ENCLOSURE AND ATTACHMENT SYSTEM FOR SAME

[75] Inventor: Kent H. Clark, Panama, N.Y.

[73] Assignee: Cummins Engine Company, Inc., Columbus, Ind.

[21] Appl. No.: 522,606

[22] Filed: Sep. 1, 1995

Related U.S. Application Data

[63] Continuation of Ser. No. 352,527, Dec. 9, 1994, Pat. No. 5,452,693.

[51] Int. Cl.[6] ........ F02F 7/00; F16N 31/00

[52] U.S. Cl. ........ 123/195 C; 184/106; 181/208

[58] Field of Search ........ 123/195 C, 196 R; 184/106; 181/208; 220/573

[56] References Cited

U.S. PATENT DOCUMENTS

| | | | |
|---|---|---|---|
| 324,619 | 8/1885 | Wells . | |
| 3,693,602 | 9/1972 | Thien et al. . | |
| 4,048,366 | 9/1977 | Kingsbury | 123/195 C |
| 4,412,516 | 11/1983 | Hayashi . | |
| 4,522,165 | 6/1985 | Ogawa | 123/195 C |
| 4,619,343 | 10/1986 | Legenfelder . | |
| 4,677,947 | 7/1987 | Bousquet . | |
| 4,682,672 | 7/1987 | Berger et al. | 123/195 C |
| 4,709,670 | 12/1987 | Ampferer . | |
| 4,788,950 | 12/1988 | Finley | 123/195 C |

FOREIGN PATENT DOCUMENTS

| | | | |
|---|---|---|---|
| 58-23257 | 2/1983 | Japan | 123/195 C |
| 58-162729 | 9/1983 | Japan . | |
| 3294611 | 12/1991 | Japan | 184/106 |
| 669269 | 4/1952 | United Kingdom . | |
| 2066358 | 7/1981 | United Kingdom . | |

*Primary Examiner*—Erick R. Solis
*Attorney, Agent, or Firm*—Woodard, Emhardt, Naughton, Moriarty & McNett

[57] ABSTRACT

A vehicle oil pan assembly which is acoustically insulated for noise reduction includes an oil pan having a normal configuration with a base and enclosing sidewalls and further including a peripheral flange which is disposed adjacent an upper edge of the sidewall and which is used to attach the oil pan to the vehicle engine. In order to insulate the oil pan so as to reduce any noise which may otherwise be transmitted by the oil pan, a noise reducing/sound deadening enclosure is attached to the oil pan. In order to facilitate the attachment of the enclosure to the oil pan, a plurality of support brackets are welded to the oil pan and each bracket includes a plurality of support tabs. The noise-reducing enclosure is arranged with an outer skin and a foam isolation layer and the outer skin is molded so as to include a plurality of latching portions. The final component in the attachment system is a plurality of spring clips. There is one tab for each latching portion and one clip for each tab. Each clip is arranged with a hook end which is inserted into a corresponding tab and an opposite support end which is received within a corresponding latching portion. The attached and suspended nature of the noise enclosure creates a unitized assembly with the oil pan such that the enclosure does not have to be removed when the oil pan is removed for servicing.

3 Claims, 7 Drawing Sheets

Fig. 7
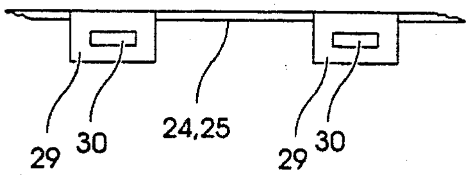
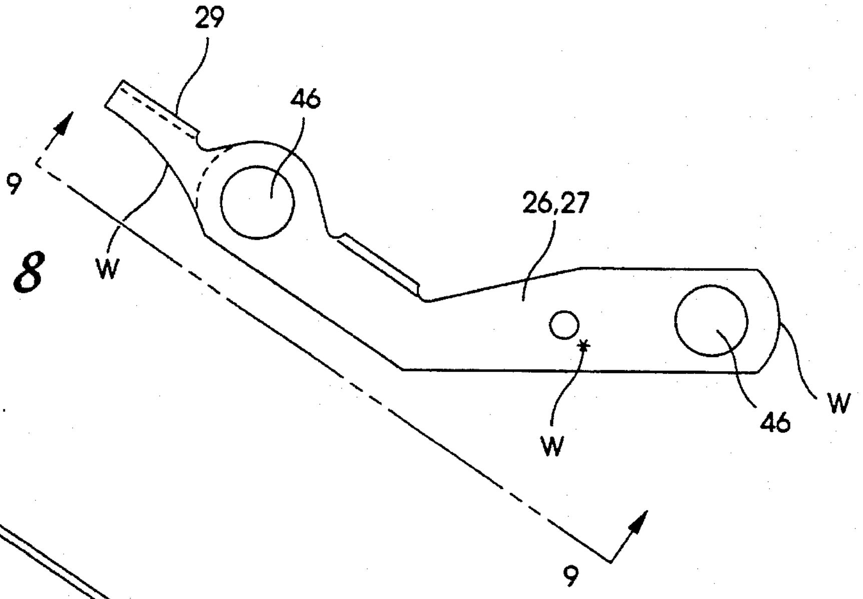
Fig. 8
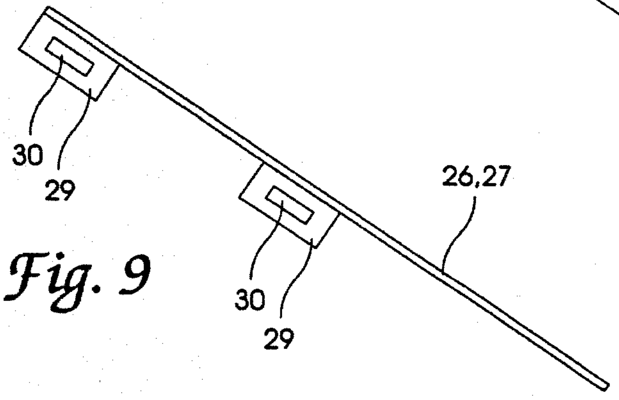
Fig. 9
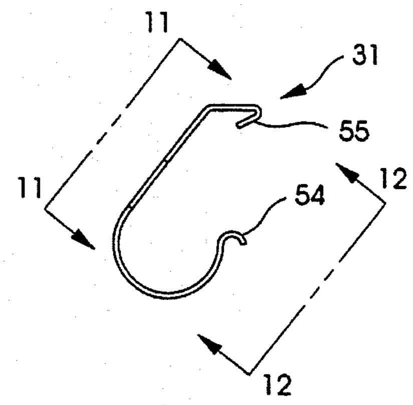
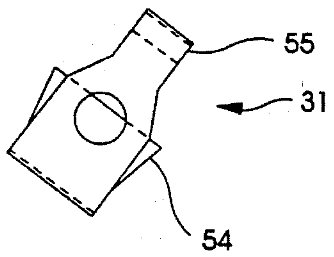
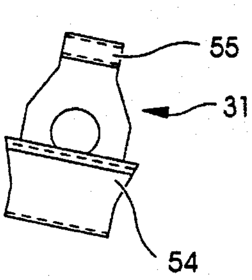
Fig. 10
Fig. 11
Fig. 12

OIL PAN NOISE ENCLOSURE AND ATTACHMENT SYSTEM FOR SAME

This application is a continuation of Ser. No. 08/352,527, filed Dec. 9, 1994, now U.S. Pat. No. 5,452,693.

BACKGROUND OF THE INVENTION

The present invention relates in general to noise reducing and sound dampening structures and attachments which can be applied to specific components and at specific locations in order to reduce or muffle the sound level which would otherwise be transmitted. More specifically the present invention relates to reducing the operation and vibration noises caused by the oil pan of a large diesel engine. This reduction in the noise level is achieved by adding a sound dampening enclosure to and around the oil pan.

Noise levels are a concern in most motor vehicles and considerable attention has been given to ways to reduce the noise levels coming from a variety of engine and vehicle locations. While the specific sources of noise may be much the same for a number of vehicles, the actual noise levels often depend on size, materials, and the specific location or mounting provisions for a particular component. For example, the oil pan can be a significant source of noise as it vibrates in response to the operation of the vehicle and vehicle vibrations. With a relatively small engine, such as that typically found in a passenger car, the size of the required oil pan is also relatively small. This smaller size results in a stiffer oil pan design and a higher natural frequency which prevents, for the most part, the oil pan from responding to engine vibration and producing sound in a manner similar to a drum.

When the size of the oil pan is increased, such as that required for a large diesel truck engine, the walls of the pan lose some of their stiffness and the oil pan has a lower natural frequency. When the oil pan then vibrates at its natural frequency, it behaves much like a bass drum and the vibration noise created by the oil pan becomes a concern, since most large diesel engine excitations have relatively low frequencies. This oil pan noise adds to the total noise level of the engine and it is this noise level which engine and vehicle designers are continually addressing in an effort to keep such noise levels at a minimum. It would therefore be an improvement to the reduction of engine/vehicle noise if the noise level caused by the oil pan could be reduced.

While there are several options to reduce the noise levels caused by the oil pan, none of the earlier attempts by others to mechanically attach a noise enclosure to an oil pan are believed to be suitable when the entirety of the oil pan design and vehicle servicing are considered. For example, it would be an improvement to unitize the assembly of a sound deadening enclosure to the oil pan such that when the oil pan is removed for servicing, the enclosure stays attached to the oil pan. Another improvement would be to enable the enclosure to be removed in the event it becomes damaged. A further improvement would be to better impede the transmission of noise from the pan to the enclosure through the attachment system.

While sound insulation panels are known to exist, they often consist of a relatively flat panel which is fixed directly to the noise-generating member, such as directly to a surface of the engine. This type of design is represented by Japanese patent reference No. 58-162729(A) (application No. 57-45899) which was published Sep. 27, 1983 and filed by Nissan Motor Company. This reference provides a non-contact sound insulation plate 17 which is made of a high damping material and pressed securely on the outer surface of the engine with a bracket. When the bracket is compressively mounted directly to the engine, this attachment scheme can also transmit vibrations. If a rigid attachment system is used to attach the outer skin, then the bracket or mounting studs will simply transfer the engine vibration directly to the outer skin and the noise will not be reduced as much as if the outer skin attachment system isolates the outer skin in some way. The relatively rigid outer skin is what blocks the sound. It acts as a very low pass filter. The layer of foam is used to isolate the outer skin from the oil pan.

While some of these issues may be less of a concern if we are only applying a sound insulation panel to an engine surface, the oil pan presents a more significant challenge. In trying to reduce vibration noise generated by a large diesel engine oil pan, vehicle servicing and removal of the oil pan have to be considered. If the enclosure is not securely assembled to the oil pan as a single unit, then the enclosure and its mounting hardware will have to be separately handled and stored during servicing. If the oil pan mounting screws are not accessible due to the manner in which the enclosure is designed, then the sound insulation enclosure will have to be removed in order to provide access to the mounting screws for removal of the oil pan. Whenever the enclosure is separated from the oil pan, such as during this type of servicing, there is a risk that the enclosure will not be reassembled to the oil pan.

There are obviously a number of significant design considerations in trying to design a suitable sound insulation enclosure for a large oil pan. While this task is significant, the present invention does provide a unique combination of components which achieves all of the design objectives and overcomes the various problems which have been mentioned.

In addition to Japanese reference No. 58-162729(A), there are other patents which are concerned with noise reduction and the following listing is believed to be a representative sampling of such other patents:

| PATENT NO. | PATENTEE | ISSUE DATE |
|---|---|---|
| 3,693,602 | Thien et al. | Sep. 26, 1972 |
| 4,412,516 | Hayashi | Nov. 1, 1983 |
| 4,619,343 | Lengenfelder | Oct. 28, 1986 |
| UK 2,066,358 | | Jul. 8, 1981 |
| UK 669,269 | | Apr. 2, 1952 |

Since the present invention uses a clip design to help secure the enclosure to the oil pan, other patents have been considered for their disclosure of fastening arrangements using clips and spring clamps. The following listing of U.S. patents is believed to be a representative sampling of these earlier fastener designs:

| U.S. Pat. No. | PATENTEE | ISSUE DATE |
|---|---|---|
| 324,619 | Wells | Aug. 18, 1885 |
| 4,677,947 | Bousquet | Jul. 7, 1987 |
| 4,709,670 | Ampferer | Dec. 1, 1987 |

SUMMARY OF THE INVENTION

A vehicle oil pan assembly which is acoustically insulated for noise reduction according to one embodiment of the present invention comprises an oil pan having an enclosing sidewall and a peripheral flange disposed adjacent an upper edge of the sidewall, a plurality of support brackets securely affixed to the oil pan flange wherein each bracket of this plurality includes a plurality of support tabs, a noise-reducing enclosure including an outer skin and a foam isolation layer, the foam layer being positioned up against the enclosing sidewall of the oil pan, the outer skin including a plurality of latching portions. The assembly further including a plurality of clips each of which are formed with a first hook end and a second, opposite support end, each of the hook ends being received in a corresponding one of the support tabs and each of the support ends being received by a corresponding one of the latch portions.

One object of the present invention is to provide an improved vehicle oil pan assembly which is insulated to reduce the noise which would otherwise be transmitted from the oil pan.

Related objects and advantages of the present invention will be apparent from the following description.

BRIEF DESCRIPTION OF THE DRAWINGS

FIG. 7 is a side elevational view of the FIG. 6 mounting bracket.

FIG. 8 is a top plan view of a second mounting bracket used in the FIG. 1 assembly according to the present invention.

FIG. 9 is a side elevational view of the FIG. 8 mounting bracket.

FIG. 10 is a side elevational view of a clip used in the FIG. 1 assembly according to the present invention.

FIG. 11 is a front elevational view of the FIG. 10 clip as viewed in the direction of arrows 11—11 in FIG. 10.

FIG. 12 is a rear elevational view of the FIG. 10 clip as viewed in the direction of arrows 12—12 in FIG. 10.

DESCRIPTION OF THE PREFERRED EMBODIMENT

Figure 1:
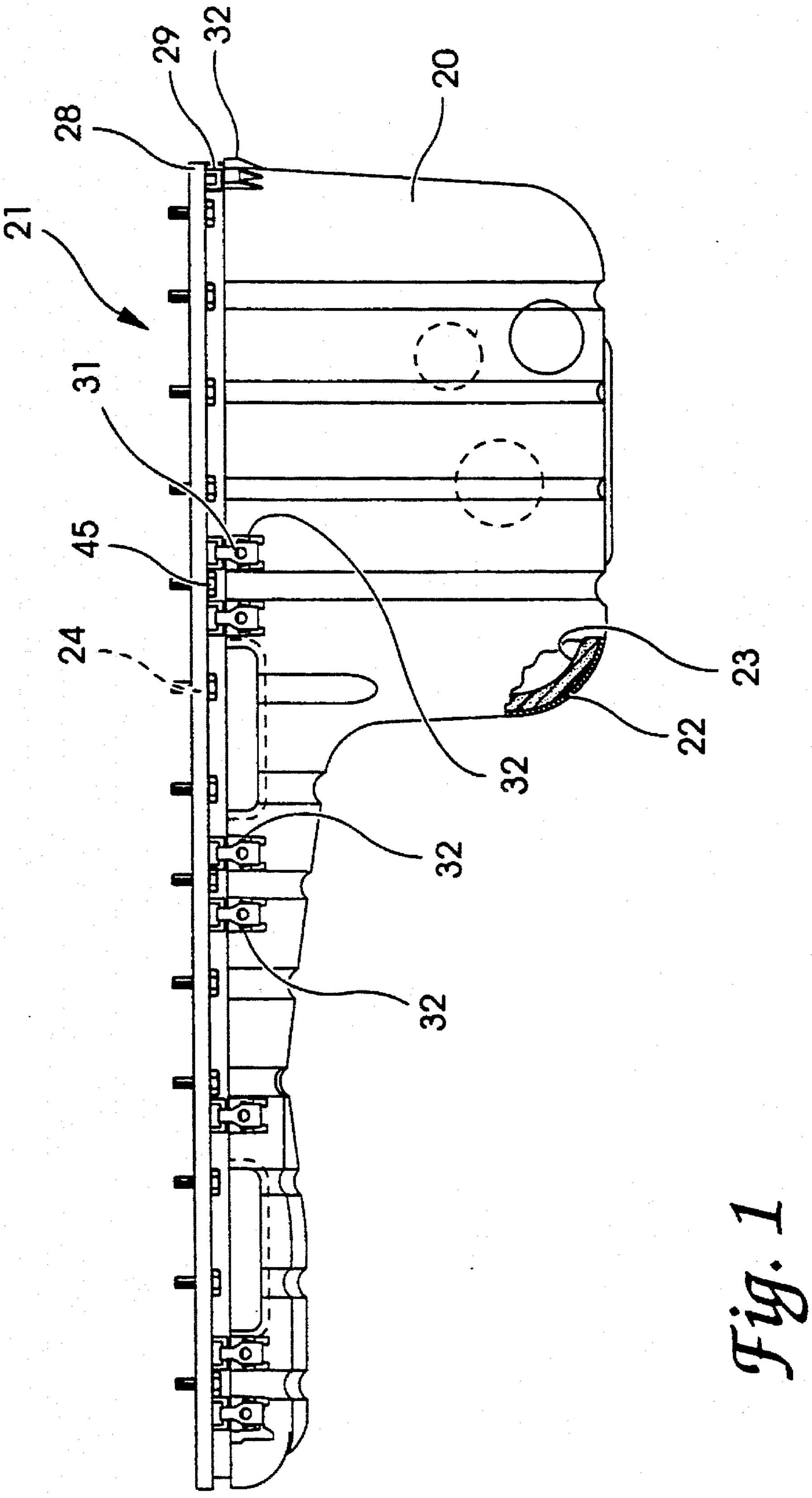
FIG. 1 is a partial, front elevational view of a noise enclosure assembled to a vehicle oil pan by means of an attachment system according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is partially illustrated an oil pan noise enclosure 20 which is attached to a vehicle oil pan 21 by means of an attachment system which is designed in accordance with the present invention. Enclosure 20 includes an outer, relatively rigid skin 22 and an inner foam isolation layer 23 which is constructed and arranged to press directly up against the outer surface of the oil pan 21, including the base of the oil pan and all of the surrounding and enclosing sidewall portions.

In order to attach the noise enclosure 20 to the oil pan 21 in a unitized manner, four steel brackets 24, 25, 26, and 27 (see FIGS. 6–9), are welded to the steel oil pan flange 28. The location of these four brackets is diagrammatically illustrated in FIGS. 2 and 4. These four brackets provide a total of eighteen vertical tabs 29 which are positioned around the perimeter of the oil pan. The location of each vertical tab is diagrammatically illustrated with an "X" symbol. Each tab 29 is pierced by a rectangular punch in order to create a receiving aperture 30 (see FIGS. 6–9) for one end of a corresponding spring steel clip 31. A total of eighteen clips 31 (see FIGS. 10 and 11) are used in the illustrated embodiment.

The outer skin 22 of the noise enclosure 20 is molded with eighteen latch portions 32. Each latch portion is constructed and arranged to receive one end each of one of the eighteen spring steel clips. As described, each clip 31 connects one vertical tab 29 with one corresponding latch portion 32. The upper end of each clip 31 which connects into the pierced receiving aperture 30 can be thought of as a hook end. The opposite end of the hook which is received by a corresponding latch portion can be thought of as the support end of the clip. It is important that the number of tabs 29 and the perimeter spacing of the tabs 29 agree and align with the number and perimeter spacing of the latch portions 32. In this manner the clips will snap into position with a substantially vertical alignment.

The number and spacing of tabs 29 and latch portions 32 will depend on the specific size and shape of the oil pan. With a different size and shape of oil pan to that which is illustrated in FIG. 1, there may be more or fewer tabs 29 and latch portions 32 and the perimeter spacing between adjacent tabs and adjacent latch portions may change. As the specific size and shape of the oil pan changes, the number and style of brackets may also change.

Figure 3:
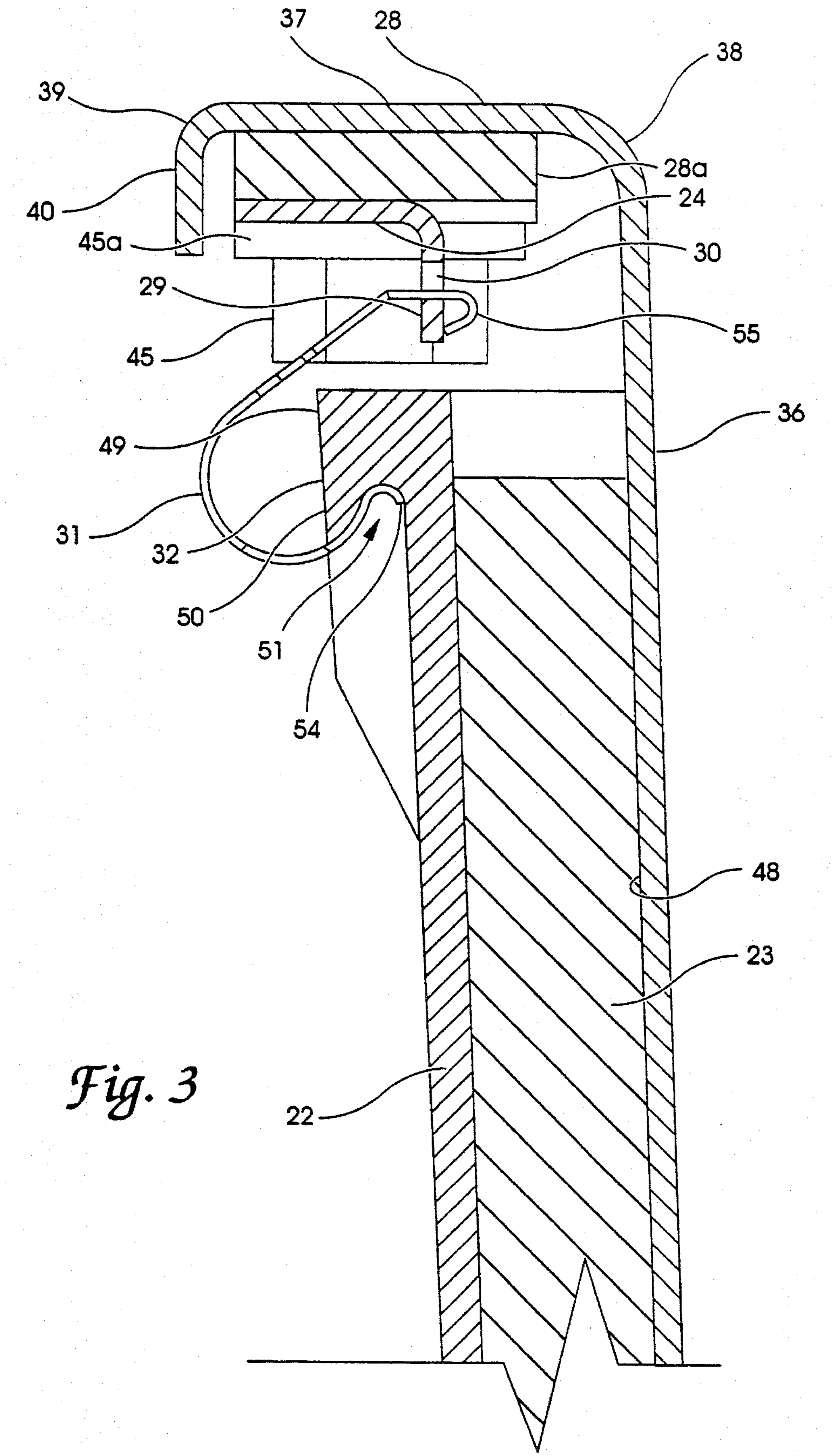
FIG. 3 is a partial, side elevational view in full section of the FIG. 1 assembly.
Figure 6:
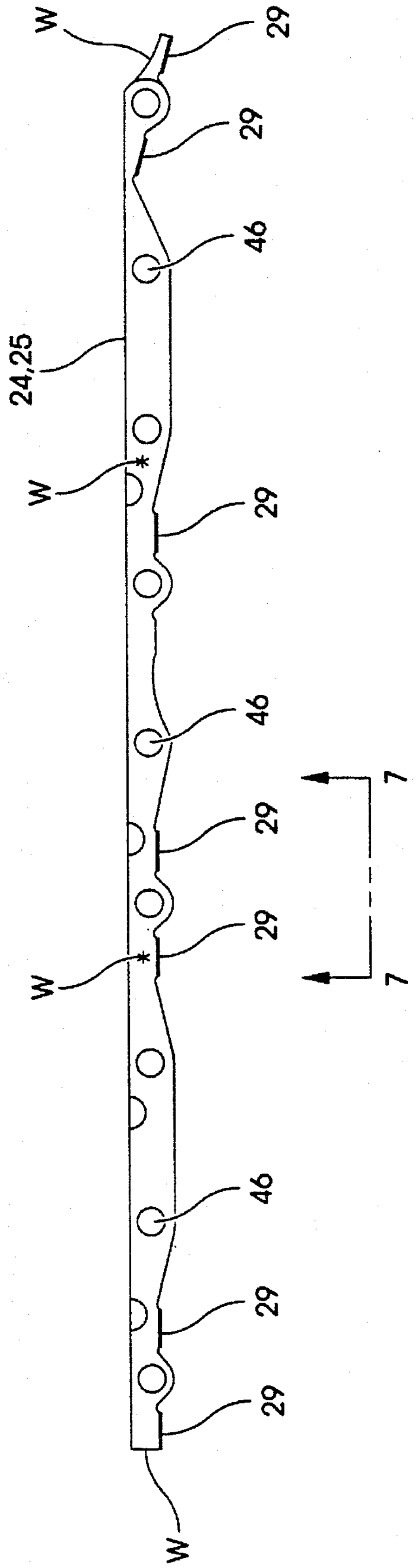
FIG. 6 is a top plan view of a first mounting bracket used in the FIG. 1 assembly according to the present invention.

Referring now to FIG. 3, the specific configuration of how each clip 31 connects the noise enclosure 20 to the four brackets is illustrated. These four brackets 24–27 are welded to the stiffening strip **28*a* of oil pan flange 28. The weld locations are illustrated in FIGS. 6 and 8 by the "W" notation. The oil pan flange 28 is integral with the oil pan wall 36 and includes an upper surface portion 37 positioned between two 90 degree radius bends 38 and 39. A depending, outer lip portion 40 completes flange 28. With the oil pan wall 36 oriented in a substantially vertical position, the upper surface portion 37 will be substantially horizontal and the lip portion 40 will be substantially vertical and substantially parallel to the oil pan wall 36. Flange 28 is used to mount the oil pan to the engine by means of hexhead bolts 45 and associated mounting hardware, such as washer 45*a***, as would be expected and customary for this type of threaded engagement.

As described, the four steel brackets 24–27 are welded to the steel stiffening strip **28*a* of the oil pan flange 28 and one bracket 24 is illustrated in FIG. 3. The position of bracket 24 relative to the oil pan wall 36, upper surface portion 37, and lip portion 40 are all illustrated in FIG. 3 and the specific designs of brackets 24–27 are illustrated in FIGS. 6–9. Brackets 24 and 25 are substantially linear as illustrated in FIGS. 6 and 7 and each one provides seven vertical tabs 29. Brackets 26 and 27 are bent at a slight angle as illustrated in FIGS. 8 and 9 and each bracket provides two vertical tabs 29. There are accordingly a total of eighteen vertical tabs 29 positioned around the periphery of the oil pan 21. Each bracket 24–27 provides a plurality of clearance holes 46 (see FIGS. 6 and 8) providing clearance around the hexhead mounting bolts 45 which attach the oil pan 21 to the engine. Enclosure 20 includes corresponding semicircular clearance apertures 47 (see FIG. 4) so that the hexhead bolts 45 can be removed in order to remove the oil pan 21 for repair and servicing, without having to first remove the noise enclosure 20**.

As is being described, the attachment system of the present invention creates a type of "unitized" assembly of the noise enclosure 20 and oil pan 21. The noise enclosure 20 is not glued or otherwise permanently affixed directly to the oil pan 21, but their suspended assembly is secure and for normal handling and use, these two components act as a single unit. If the noise enclosure needs to be repaired or replaced, it can be removed by unclipping the enclosure from the bracket tabs 29, otherwise the enclosure and oil pan stay securely together. The outer surface of the oil pan wall 36 is coated with an abrasion protective coating in order to keep any grit that gets between the foam isolation layer and oil pan wall from abraiding the paint and letting rust start.

The noise enclosure 20 includes a relatively rigid outer skin 22 which is molded so as to generally conform to and fit the shape of the oil pan out of a "baryskin" material which is offered by H. L. Blachford. The molded enclosure is made somewhat larger than the oil pan in order to provide a clearance space for the polyurethane foam isolation layer 23. The outer skin 22 and foam isolation layer 23 are adhesively bonded to each other so as to comprise a single component. As illustrated, when the noise enclosure 20 is clipped into position on the oil pan 21, the foam isolation layer 23 abuts up against the outer surface 48 of the oil pan wall. The foam isolation layer prevents the oil pan wall vibrations from being mechanically transmitted to the outer skin.

Figure 2:
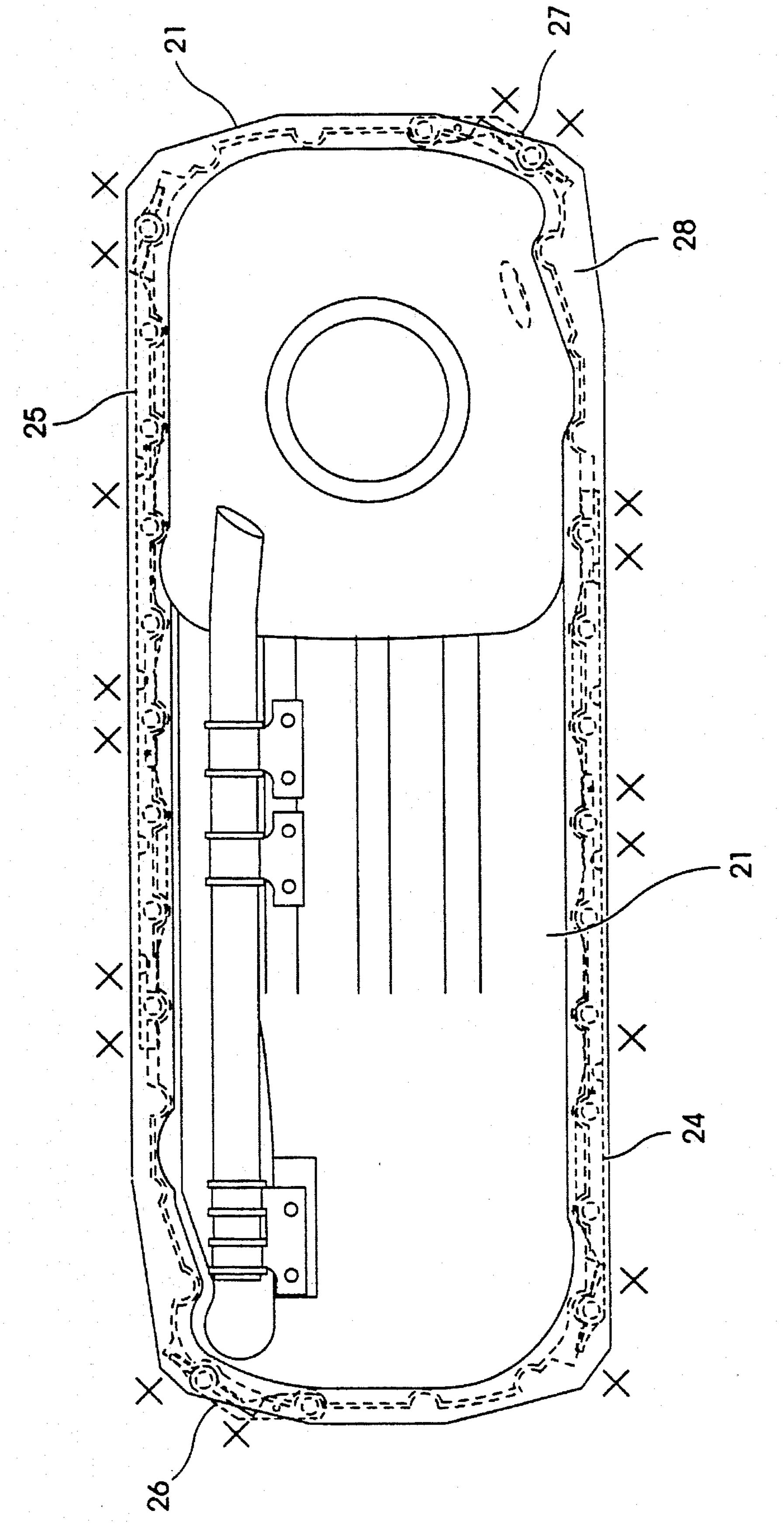
FIG. 2 is a diagrammatic, top plan view of the FIG. 1 oil pan and noise enclosure assembly showing the location of various mounting brackets which are welded to the oil pan.
Figure 4:
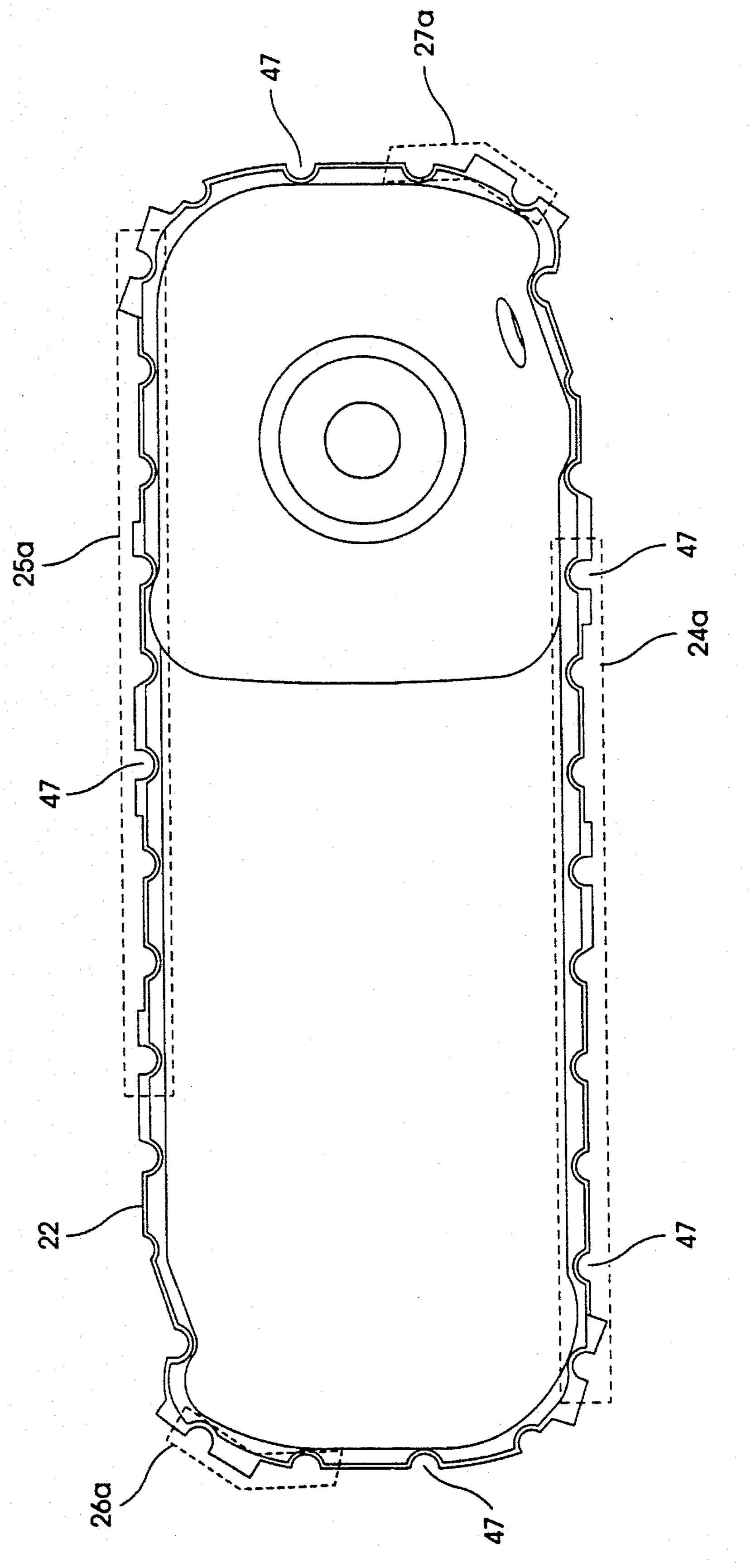
FIG. 4 is a top plan view of the FIG. 1 noise enclosure according to the present invention.
Figure 5:
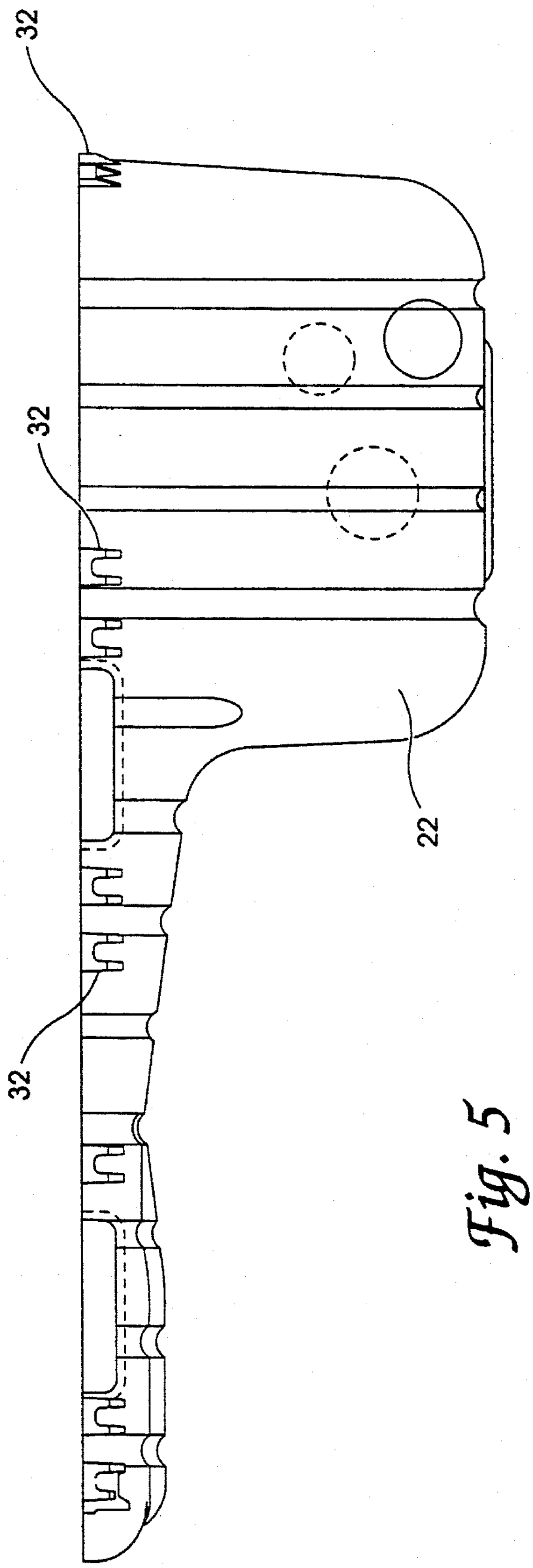
FIG. 5 is a side elevational view of the FIG. 4 noise enclosure.

Referring now to FIGS. 4 and 5, in addition to FIG. 3, the outer skin 22 of noise enclosure 20 is illustrated. As noted, noise enclosure 20 is formed (molded) with eighteen molded latch portions 32 which are positioned around the noise enclosure periphery so as to be in substantially vertical alignment with the pierced aperture 30 of each tab 29. Each latch portion 32 includes an outwardly extending boss 49 which is shaped and configured with an overhanging lip 50 and an underneath receiving recess 51 as illustrated in the side elevational, section view of FIG. 3. Based on the top plan view orientation of FIG. 4 and as illustrated in FIG. 2, brackets 24 and 25 will be located in the lower left and upper right portions of the oil pan where broken line outlines **24*a* and 25*a* have been diagrammatically added. Bracket 26 and 27 will be located in the upper left and lower right corners of the oil pan where broken line outlines 26*a* and 27*a* have been diagrammatically added. Each boss 49 location corresponds to the location of a latch portion and thus corresponds to a tab and clip location in the final assembly of the enclosure 20 and oil pan 21**.

Still referring to FIG. 3, in order to assemble the noise enclosure 20 to the oil pan 21, the bottom end 54 of each of the eighteen clips 31 is first inserted upward into the mating latch portion 32. In order, every latch portion on the noise enclosure receives a clip in this manner. The entire assembly of enclosure 20 and the eighteen clips 31 is then placed onto the oil pan 21 and the top hook end 55 of each clip is then snapped through a corresponding rectangular aperture 30 which has been pierced in each tab 29. The top hook end 55 of each clip 31 (see FIGS. 10 and 11) has a barbed shape and the construction and arrangement of the clips, tabs, and latch portions is such that each clip must be sprung open a certain degree in order to pass this barbed, top hook end 55 through the corresponding aperture 30.

The internal detail of each latch portion 32 includes a dovetail, interlocking shape which is recessed beneath the overhanging portion and this prevents the clips 31 from popping out or otherwise inadvertently becoming disengaged. The width of the bottom support end 54 of each clip 31 is greater than the width of the corresponding recess in each latch portion 32, thereby producing a tight, interference fit. Once assembled, the clips can neither disengage the latch portions nor disengage the tabs, without forceful and purposeful intervention. In the event that the noise enclosure is damaged in the field, the damaged enclosure and clips can be forceably removed without damaging the mounting bracket tabs. A new enclosure can then be attached using a new set of clips.

One of the concerns in any sound dampening or noise reducing arrangement is whether a sound path is created which would permit, in this situation, the vibration from the oil pan to reach the outer skin of the enclosure and beyond. The outer skin is the primary sound deadening member, because it is mechanically isolated from the engine. Further, high frequency sound waves cannot excite the dense outer skin. The concern with using a mechanical attachment is how to prevent the engine and oil pan from mechanically transmitting vibration to the outer skin. In the present invention, there is a direct metal to metal sound path created from the oil pan 21 to the four brackets 24–27 and thereafter to the tabs 29. However, the clip attachment provides a tension-only connection to these tabs. Any mechanical sound transmission from the oil pan to the outer skin of the enclosure is limited, due to the tension-only loading of the clips. One vibration displacement cycle of the pan cannot produce a matching cycle in the enclosure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle oil pan assembly which is acoustically insulated for noise reduction comprises:

an oil pan having an enclosing sidewall and a peripheral flange disposed adjacent an upper edge of said sidewall;

a plurality of support brackets securely affixed to said oil pan flange, each bracket of said plurality including a plurality of support tabs;

a noise-reducing enclosure including an outer skin and an isolation layer, said isolation layer being positioned between the enclosing sidewall of said oil pan and said outer skin, said outer skin including a plurality of latching portions; and a plurality of snap-on clips for connecting together each of said plurality of support tabs with a corresponding one of said plurality of latching portions.

2. An enclosure assembly for reducing noise caused by a vehicle oil pan, said vehicle oil pan being constructed and arranged with receiving tabs and said enclosure assembly being constructed and arranged to connect to said oil pan via said receiving tabs, said enclosure assembly comprising:

a noise-reducing enclosure including an outer skin and an isolation layer, said isolation layer being constructed and arranged to be positioned between said vehicle oil pan and said outer skin, said outer skin including a plurality of latching portions; and a plurality of snap-on clips for connecting together each of said plurality of receiving tabs with a corresponding one of said plurality of latching portions.

3. A vehicle oil pan assembly which is acoustically insulated for noise reduction comprises:

an oil pan having an enclosing sidewall and a securement portion.

a plurality of brackets attached to said securement portion and providing a plurality of support members;

a noise-reducing enclosure including an outer skin and an isolation layer, said isolation layer being positioned between the enclosing sidewall of said oil pan and said outer skin, said outer skin including a plurality of latching portions; and a plurality of snap-on clips for connecting together each of said plurality of support members with a corresponding one of said plurality of latching portions.

* * * * *